Dec. 8, 1936.       J. W. CORRISTON       2,063,229
REFRACTORY LINING SUPPORT FOR FURNACES
Filed Jan. 29, 1936         2 Sheets-Sheet 1
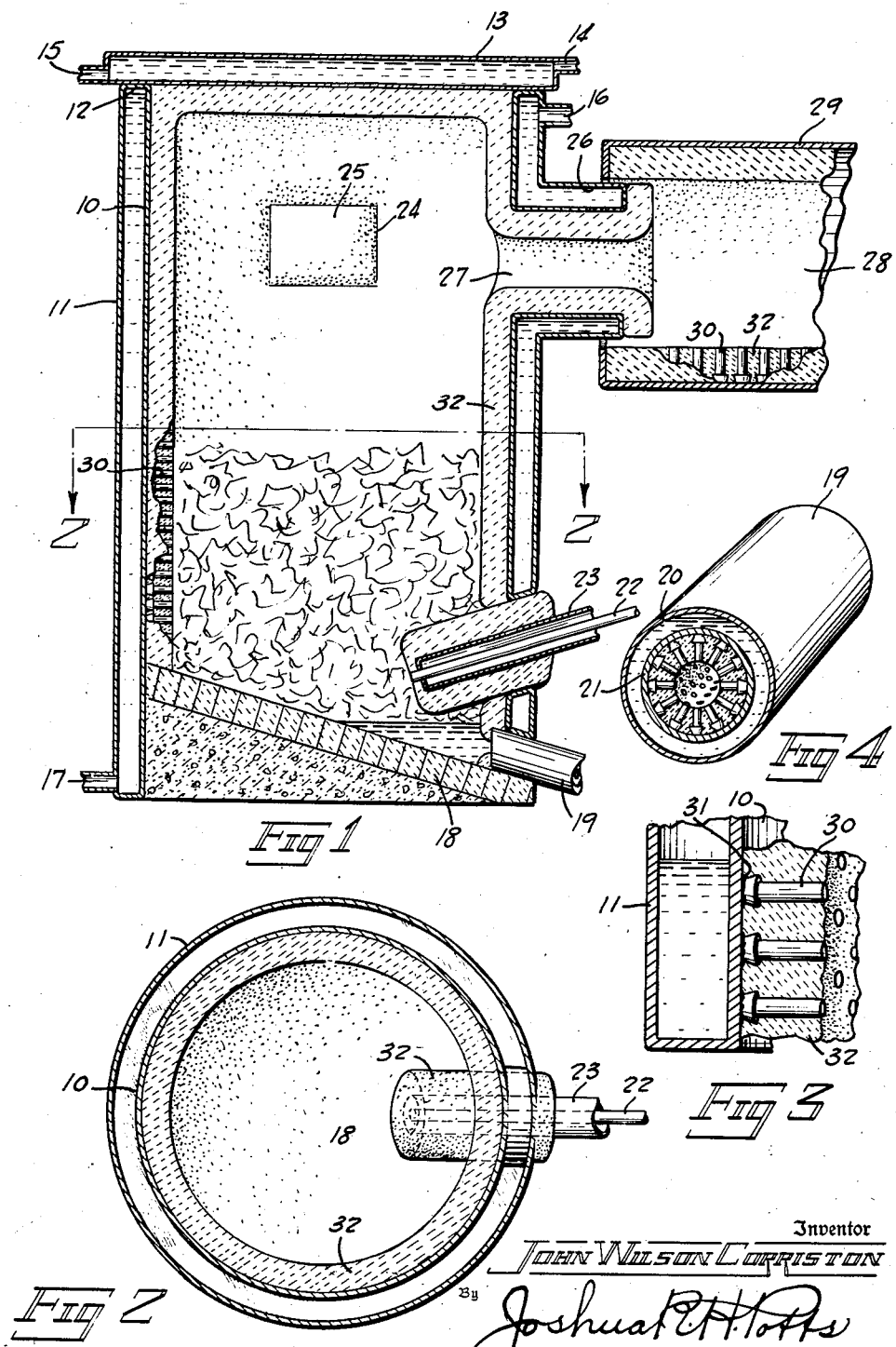

Dec. 8, 1936.    J. W. CORRISTON    2,063,229
REFRACTORY LINING SUPPORT FOR FURNACES
Filed Jan. 29, 1936    2 Sheets-Sheet 2
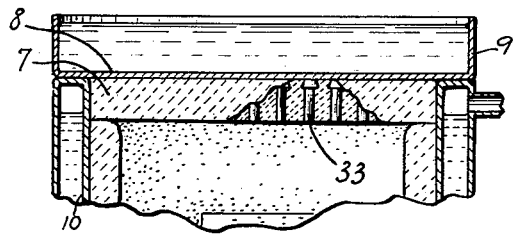
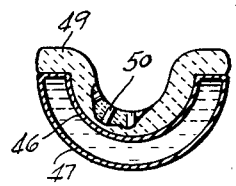
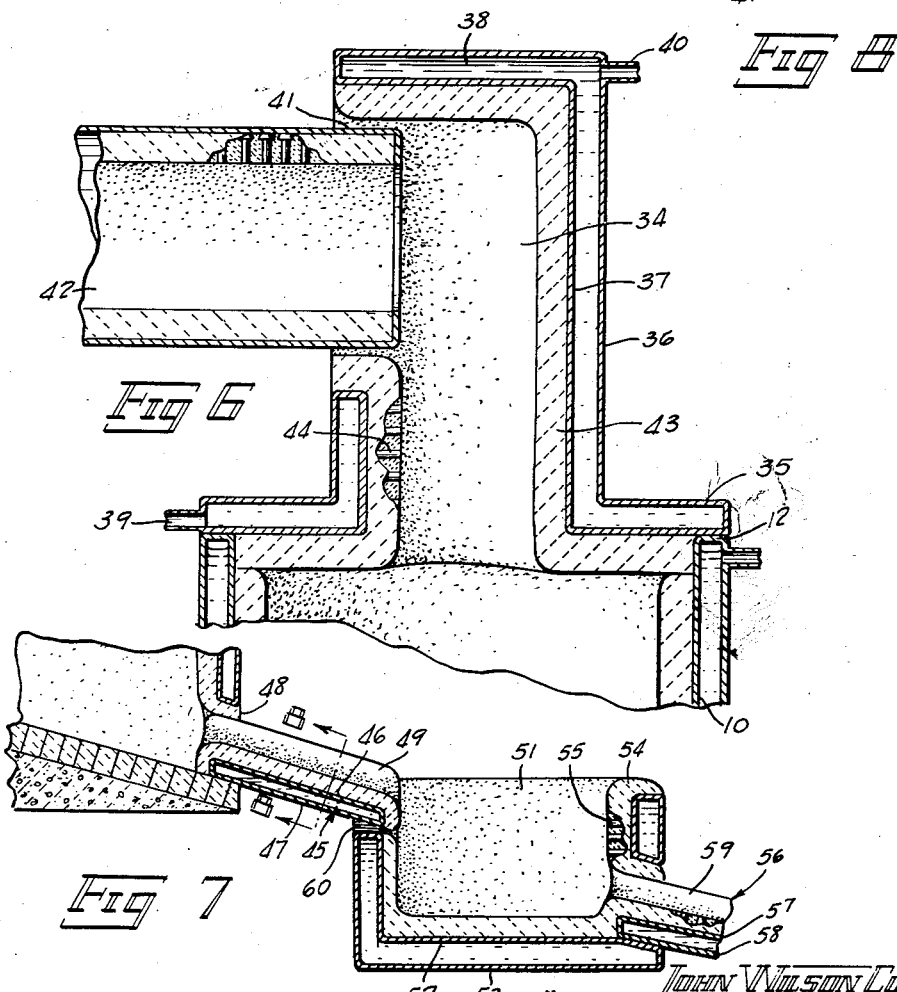

Patented Dec. 8, 1936

2,063,229

UNITED STATES PATENT OFFICE 2,063,229

REFRACTORY LINING SUPPORT FOR FURNACES

John Wilson Corriston, Springfield, Pa., assignor of one-half to Raymond E. Griffith, Pittsburgh, Pa.

Application January 29, 1936, Serial No. 61,286

10 Claims. (Cl. 122—6)

This invention relates to furnace constructions and is more particularly concerned with that type furnace commonly referred to as a chemical recovery furnace which is used for industrial purposes, and particularly in the manufacture of paper.

In the manufacture of paper from wood pulp, a digesting process is widely employed which is known as the sulphate process, in which sodium sulphate reacts with the carbon of the cellulose fibres with a sodium sulphide resulting from this reaction. This sodium sulphide is present in the form of a so-called "black liquor" which is separated from the fibrous content of the mixture resulting from the digesting process.

In accordance with approved present day manufacturing processes, this "black liquor" is treated for the recovery of the valuable chemical contents thereof by subjecting the same to the action of a recovery furnace, and this invention is concerned primarily with the improvement of furnace constructions designed for such use.

For a better understanding of the present invention, reference is made to the now known types of furnace construction availed of for the recovery of chemicals in the manner above outlined. First, there is the ordinary refractory structure built from heat and chemical resisting refractory material, such as chrome brick or soapstone blocks. However, due to the great heat which is generated in these furnaces and which is necessary to the proper recovery of the valuable chemical content of the material which is treated in the furnace, this refractory material is attacked by the chemicals in the furnace with the result that its service life is comparatively short.

There are also in prevalent use certain furnaces which involve the presence of a steel shell which is lined with a refractory material but such a structure is open to the same objection of quick destruction of the refractory lining due to the effect of the chemicals thereon in the presence of high temperatures.

Inasmuch as the high temperature is one of the factors which renders steel or other metals, as well as refractory materials, susceptible to attack by chemicals, certain furnaces have been built which are of a double shell construction which provides for the circulation of water between the shells for cooling purposes. When such a construction is used under actual service conditions it is found that the cooling effects of the water have a markedly deleterious effect on the recovery action of the furnace itself owing to the need for a high temperature to cause the recovery action of the chemical content of the furnace.

With furnaces of this type of construction, a sort of paradoxial condition exists. If the walls are not appreciably cooled, in some manner, then these walls are susceptible to attack by the heat and chemicals and are quickly destroyed and if the temperature of the walls is maintained sufficiently low to prolong the life thereof, then the cooling effects of the walls detract from the recovery action of the furnace.

It is also a fact that if the walls are maintained at a comparatively low temperature, as related to the materials undergoing combustion, that they will necessarily absorb great quantities of heat from that combustion. While such heat may be recovered by various means as by storing it in water or in preheated air, the efficiency of the entire process is ordinarily thereby reduced. It is essential that the heat of combustion be directed, as far as possible in maximum quantity to the stack or flue outlet of the furnace, where it can be later utilized directly in evaporating and dehydrating the black liquor.

Recognizing the disadvantageous features of the water cooled type of furnace, certain research workers, in attempting to improve such a structure, have lined the lower part of the inner wall of such a furnace with a refractory material. However, due to the inability of the circulating water to exert the proper heat conducting effect to the refractory material itself, the latter is rendered susceptible to attack by the chemicals in the furnace with the resulting short service life thereof.

With the foregoing disadvantageous feature of the now known furnace constructions of this type in mind, this invention has in view, as an important object, the provision of a chemical recovery furnace of the character noted which is designed for industrial use and which includes a double steel shell structure, the inner shell of which is lined with a refractory material which is held in place on the inner shell by studs which extend from the shell entirely through the refractory material. When the inner shell is lined with a refractory material in this manner, the circulation of the water has the desired cooling effect on the steel shell and the studs, while the latter are effective to conduct heat from the refractory material to the cooling medium. As a result, all the advantages of a refractory lining are obtained and, at the same time, the refractory lining is maintained sufficiently cool to protect it from the action of the chemicals in the furnace.

More particularly, another object of the present invention is to provide, in a furnace construction of the character noted, a refractory lining which is held in position on the inner shell of the double steel shell construction by a plurality of metal studs which are placed comparatively close together and which are welded to the inner shell. By maintaining this inner shell imperforate, all liability of leakage of the cooling water into the combustion chamber of the furnace is eliminated.

Other more detailed objects and advantages will in part become apparent and in part be hereinafter stated as the description of the invention proceeds.

The invention, therefore, comprises a chemical furnace designed for industrial use consisting of a double steel shell structure, the inner shell of which has a plurality of metal studs welded thereto and extending inwardly therefrom and on which is embedded a refractory lining.

For a full and more complete understanding of the invention, reference may be had to the following description and accompanying drawings wherein:

Figure 1 is a side view, partly in section and partly in elevation, of a chemical recovery furnace made in accordance with the precepts of this invention, Figure 2 is a horizontal sectional showing taken about on the plane represented by the line 2—2 of Figure 1, Figure 3 is an enlarged detailed showing, partly in section and partly in elevation, of a portion of the furnace wall, bringing out the manner in which the metal studs are welded to the inner wall and extend through the refractory lining, Figure 4 is an enlarged detail showing in perspective of the spout which discharges the recovered chemicals, Figure 5 is a fragmentary sectional showing of the upper part of a furnace of a modified form, in which an open top water pan is availed of as a closure for the open top of the furnace, Figure 6 is another sectional view somewhat similar to Figure 5 showing a still further modified form, in which the rotary furnace introduces the black ash directly into the top structure of the furnace.

Figure 7 is another fragmentary showing in section of a modification of the discharge spout construction, and Figure 8 is a detailed sectional showing taken about on the plane represented by the line 8—8 of Figure 7.

Referring now to the drawings, wherein like reference characters denote corresponding parts, a recovery furnace is shown as comprising an inner cylindrical shell 10, which is preferably of steel, and which is spaced from the outer cylindrical shell 11. At the top, the shells 10 and 11 are preferably joined by a ring portion 12 which may be integral therewith.

The inner shell 10 defines the combustion chamber of the furnace which is closed at the top by an upper cover structure 13 which is also of the spaced wall construction to provide for the circulation of a cooling medium, such as water, therethrough.

As shown in the drawings, an inlet is indicated at 14 and an outlet at 15 for the cover 13. Likewise, a water inlet is shown at 17 and an outlet at 16 for the cooling water which may circulate in the space between the cylindrical walls 10 and 11.

Obviously, baffles, valves, and other devices, necessary for the proper control of the flow of the circulating cooling medium may be provided but these form no part of the present invention and are, therefore, not here illustrated.

The combustion chamber of the furnace terminates at the bottom in the form of an inclined bottom wall 18 which may be made from a suitable refractory material, such as chrome brick. Adjacent the bottom wall 18, the cylindrical walls 10 and 11 of the furnace are provided with an opening for receiving a discharge spout designated 19. This discharge spout is shown in detail in Figure 4 as including outer and inner tubular members 20 and 21 respectively, which are spaced apart to provide for the circulation of the cooling medium therebetween, and the inner shell 21 is provided with a refractory lining to be hereinafter described.

Spaced a short distance above the discharge spout 19, the walls 10 and 11 are also provided with an opening for receiving a conduit assembly for introducing air into the combustion chamber. This assembly comprises an air line 22, which is maintained in spaced relation from an outer tubular member 23 which passes through an opening in the cylindrical walls.

This member 23 is spaced from the air line 22 to provide for the circulation of the cooling medium therebetween. The tubular member 23 is protected by a refractory material in a manner to be later described.

Spaced a short distance from the top edge of the walls 10 and 11, the latter are formed with a charging opening 24 which may be closed by a hinged door or other suitable removable closure member which is indicated somewhat diagrammatically at 25. It is through this opening 24 that the materials consumed and treated in the furnace are introduced.

At one side and at the upper part of the combustion chamber, the walls 10 and 11 are deformed to provide an outwardly extending tubular projection designated generally as 26. This projection 26 conforms to the spaced wall construction of the furnace and provides an opening, designated 27, through which hot gases from the furnace pass into a rotary furnace construction which is fragmentarily shown in Figure 1 and is designated 28.

This rotary furnace consists of a tubular steel shell 29 which is provided with a refractory lining in accordance with the precepts of this invention. The rotary furnace 28 overlaps the projection 26 but is in slightly spaced relation therefrom. The particular supporting and operating structures for the rotary furnace 28 are not here shown or illustrated as they are well-known in this art and do not enter into this invention.

As previously indicated, all the various walls and surfaces which are exposed to heat and the action of the chemicals, are all provided with a refractory lining which is preferably of a chromite type and this refractory material is applied and maintained in position on the respective walls in a manner clearly shown in detail in Figure 3.

Outstanding from the wall 10, or the other walls 13, 21, 23, 26 and 29, as the case may be, are a plurality of metallic studs 30 which are welded to the respective walls as indicated at 31. These studs may be of any shape desired but as here shown are provided with an enlarged portion adjacent the welded construction that is to accommodate this type of anchoring to the wall. Obviously, the invention is not to be limited in this particular detail.

The refractory material is preferably applied in a plastic state to the studs 30 so that the latter extend entirely through the refractory material. This refractory lining is referred to by the reference character 32. From the foregoing it is evident that all of the various walls, which ordinarily are subjected under great heat to the action of the chemical, are protected by the refractory lining which is applied in the manner indicated.

The operation of the above described furnace is substantially as follows. The black liquor coming from the digesting process of the paper making is introduced into the rotary furnace 28 in a partially dehydrated condition.

The hot gases which emanate from the combustion chamber of the furnace proper pass through the opening 27 in the rotary furnace 28 and serve to more or less completely dehydrate the black liquor so that the latter assumes the form of a so-called "black ash" which is discharged from the rotary furnace 28 in the space between the wall thereof and the tubular projection 26. This black ash may now be introduced through the opening 24 as by shoveling.

In installations which do not include this rotary furnace 28, the black liquor is sprayed directly into the combustion chamber. It is this black material which is consumed and supports combustion, that is, it is the organic content thereof which is consumed. The inorganic content which contains the chemicals which are desired to be recovered pass out through the spout 19 to the proper receptacle therefor.

It is evident that the studs 30 which extend through the refractory lining 32 have a heat conducting effect which maintains the refractory lining 32 in a cool state sufficient to protect it from the action of the chemicals in the combustion chamber. As a result, the lining has a long service life, as such a life is usually controlled by the action of the chemicals thereon.

Referring now to Figure 5, a somewhat modified form of furnace construction is shown in which the open top of the combustion chamber, which is defined by the inner shell 10, is closed by an open top water pan 9 having a bottom 8, the under surface of which is provided with a refractory lining 7 that is supported in position on the said under side by metallic studs shown at 33.

These studs 33 are welded to the bottom 8 in a manner heretofore described and are effective to maintain and support the refractory 7, which is preferably applied in a plastic state, in proper position.

This improved open pan closure may be utilized in conjunction with a combustion chamber that is lined in the manner shown in Figure 1 and is also adaptable for use with other now known types of furnace construction. Inasmuch as the flat upper surfaces, such as the bottom 8, receive and absorb a great amount of heat, it is important that the surfaces be protected in the manner indicated.

Figure 6 develops still another modified form in which the top closure for the combustion chamber defined by the inner shell 10, takes the form of a tower designated generally 34, which is formed with a base 35 that fits over the top edge 12 of the furnace. The tower 34 and base 35 are of a double steel shell wall construction which is defined by an outer wall 36 and an inner wall 37, this spaced shell construction being carried out in the base 35 as well as the top 38 in accordance with the usual practice above described. A cooling medium circulates between the inner and outer shells 36 and 37, an inlet for the cooling medium being indicated at 39 and an outlet at 40. The tower 34 is formed at one side with an opening 41 into which projects one end of a rotary furnace 42 which is generally similar to the rotary furnace 28. As shown in Figure 6 however, the rotary furnace 42 projects into the tower 34 through the opening 41 rather than around a projection as shown in Figure 1. This rotary furnace 42 is supported and operated in a manner well-known in this art and is effective to discharge a black ash directly into the tower 34 from whence it passes into the combustion chamber of the furnace.

The inner wall 37 is lined on its inner surface with a refractory as are other similarly exposed surfaces in accordance with the principles of this invention. Figure 6 develops this refractory, which is referred to as 43, as being held in position by studs 44 which are welded to the inner shell 37 in the usual manner. It is notable that that portion of the shell 37 which forms the bottom side of the base 35, which constitutes a part of the closure for the combustion chamber proper, is also lined with a refractory in this same manner.

Referring now to Figure 7, a somewhat modified form of discharge spout is shown, this spout being illustrated as defined by a trough 45 having an inner wall 46 and an outer wall 47 between which a cooling medium circulates in the usual manner. This trough 45 projects through an opening 48 formed in the walls 10 and 11 of the combustion chamber to receive the chemicals recovered therein, the surfaces of the inner trough wall 46 being covered with a refractory 49 which is maintained and supported in position in the usual manner by outstanding studs which are indicated at 50 in Figure 8.

A reservoir is shown in Figure 7 and referred to by the reference character 51. This settling tank receives the recovered chemicals from the discharge spout 45. The settling tank 51 is shown as being defined by inner and outer spaced shells 52 and 53 respectively, through which circulates a cooling medium in the usual manner, the inner surface 52 being covered with a refractory lining 54 that is held in position by studs shown at 55. While the spout 45 may overlie one top edge of the reservoir 51, I have shown one side thereof as being provided with a recess for receiving an extremity of the spout 45, this being indicated at 60.

The reservoir 51 is also provided with an outlet in the form of a spout 56 which takes the form of a trough defined by spaced inner and outer walls 57 and 58, through which the usual cooling medium circulates and the inner wall 57 of which is covered by a refractory lining designated 59, this lining 59 being held in position on the wall 57 in the usual manner.

Another important advantage associated with the use of a furnace construction of the character described is that all heat which is conducted away from the refractory lining by the circulating water may be utilized in that the hot water coming from the circulating system may be availed of for useful purposes in other steps of the paper making process.

In summary, the furnace construction herein described, improves the desirable features of constructions now practiced in the art and also permits wide usage, due to the economical means provided to attain said features.

While a preferred specific embodiment of the invention is hereinbefore set forth, it is to be clearly understood that I am not to be limited to the exact constructions illustrated and described, because various modifications of these details may be provided in putting the invention into practice within the purview of the appended claims.

I claim:

1. A chemical recovery furnace of the character described comprising an inner shell, said shells being formed with an outlet for chemicals recovered in the furnace, an outer shell, a plurality of studs extending inwardly from the inner shell, and a refractory lining on the inner shell, held in position thereon by said studs.

2. A chemical recovery furnace of the character described comprising inner and outer steel shells spaced apart to provide for the circulation of a cooling medium therebetween, means disposed at the bottom of the furnace and extending between the shells for removing the recovered chemicals from the furnace and a refractory lining on the inner side of the inner shell held in position thereon by a plurality of metallic members which are welded to the inner shell and which extend entirely through the refractory lining.

3. A chemical recovery furnace of the character described including an outlet for recovered chemicals and comprising spaced inner and outer shells, said inner shell being provided with a refractory lining held in position thereon by studs extending through the lining, said shells being provided with an opening, a discharge spout in said opening including an inner tubular member, and a refractory lining on said inner tubular member.

4. A furnace of the character described including an outlet for recovered chemicals and comprising inner and outer shells spaced apart to provide for the circulation of a cooling medium therebetween, said shells being formed with a tubular projection, a rotary furnace operatively associated with said tubular projection, the wall of said rotary furnace and the inner shell being provided with a refractory lining which is held in position on the respective walls by metallic studs extending through the said lining.

5. A furnace construction of the character described including an outlet for recovered chemicals and comprising an inner steel shell, an outer shell spaced from the inner steel shell, a plurality of metallic members welded to the inner steel shell and projecting inwardly therefrom, and a refractory lining applied in a plastic state to said inner shell about the said studs.

6. A chemical recovery furnace of the character described comprising a combustion chamber defined by a double shell wall, said double shell wall being formed with an opening for introducing materials into the combustion chamber, a closure for said opening, said double shell wall also being formed with a tubular projection constituting a connection with a rotary furnace, said combustion chamber also having a double walled cover, said double shell wall being formed with an outlet for recovered chemicals, and a refractory lining on all the inner surfaces of said combustion chamber and tubular projection, said refractory lining being held in position by metallic studs extending from the respective walls through the refractory material of the lining.

7. A furnace construction of the character described including an outlet for recovered chemicals and comprising walls defining a combustion chamber having an open top, a water cooled closure for said open top, said water cooled closure having a bottom surface exposed to the heat and gases of the combustion chamber, metal studs projecting downwardly from said bottom surface, and a refractory lining embedded and held in position on the bottom surface by the said studs.

8. In a furnace construction of the character described, including an outlet for recovered chemicals and a closure for an open top combustion chamber, comprising an open top water pan having a bottom normally fitting over the top of the combustion chamber of the furnace, metallic members welded to the under side of the bottom and extending downwardly therefrom, and a refractory covering for said bottom held in position by said members.

9. In a furnace construction of the character described, including an outlet for recovered chemicals, a top structure adapted to be mounted on an open top of a combustion chamber of a furnace, said top structure comprising an upstanding tower formed with an opening adapted to have materials charged therethrough into the combustion chamber of the furnace, said tower being defined by spaced inner and outer walls, and a refractory lining on the inner surfaces of said inner wall, held in position by metallic members extending through the lining and anchored to the said inner wall.

10. In a furnace construction of the character described, including an outlet for recovered chemicals, a top structure adapted to close the upper end of a combustion chamber, said top structure comprising a base adapted to be fitted over the top edge of the combustion chamber, a tower upstanding from the base formed with an opening adapted for cooperation with a rotary furnace for receiving materials therefrom, said base and tower being defined by inner and outer walls spaced apart to provide for the circulation of a cooling medium therebetween, metallic studs projecting inwardly from the inner surface of the inner wall, and a refractory lining for the inner wall, held and supported in position on said studs.

JOHN WILSON CORRISTON.